United States Patent
Machalani et al.

(10) Patent No.: US 10,656,800 B2
(45) Date of Patent: May 19, 2020

(54) VISUAL CONFIGURATION AND ACTIVATION

(71) Applicant: Microsoft Technology Licensing, LLC, Redmond, WA (US)

(72) Inventors: Henri-Charles Machalani, Seattle, WA (US); Marina Dukhon, Kirkland, WA (US); Thomas H. Alphin, III, Kirkland, WA (US); Samer F. Sawaya, Snoqualmie, WA (US); Sarah W. McDevitt, Seattle, WA (US); Daniel W. DeKlotz, Redmond, WA (US); Jakub P. Kotynia, Redmond, WA (US); Marko Panic, Seattle, WA (US); David S. Amenta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 13/854,025

(22) Filed: Mar. 29, 2013

(65) Prior Publication Data

US 2014/0298214 A1    Oct. 2, 2014

(51) Int. Cl.
*G06F 3/0484*    (2013.01)
*G06F 3/0481*    (2013.01)
(Continued)

(52) U.S. Cl.
CPC ........ *G06F 3/0484* (2013.01); *G06F 3/04817* (2013.01); *G06F 8/61* (2013.01); *G06F 9/4451* (2013.01); *G06F 9/44505* (2013.01)

(58) Field of Classification Search
CPC ...... G06F 8/61; G06F 3/04842; G06F 3/0482; G06F 3/0481; G06F 17/30994;
(Continued)

(56) References Cited

U.S. PATENT DOCUMENTS

| 4,902,469 A | * | 2/1990 | Watson | G21C 17/00 376/216 |
| 5,742,778 A | * | 4/1998 | Hao | G06F 3/038 715/759 |

(Continued)

FOREIGN PATENT DOCUMENTS

| CN | 1956516 A | 5/2007 |
| CN | 101216763 A | 7/2008 |

(Continued)

OTHER PUBLICATIONS

"Five Steps to Windows 7 Application Readiness", Retrieved from <http://technet.microsoft.com/en-us/windows/gg189194.aspx#steps/> on Mar. 12, 2013, (Aug. 25, 2012), 4 Pages.

(Continued)

*Primary Examiner* — Renee D Chavez
*Assistant Examiner* — Carl P Lobo
(74) *Attorney, Agent, or Firm* — Newport IP, LLC; Mike R. Cicero

(57) ABSTRACT

Techniques for visual configuration and activation are described. Techniques discussed herein enable visuals to be presented to a user based on a user-specific visual configuration. The visuals are activated such that the visuals are selectable to access various functionalities. In at least some embodiments, a visualization that represents a user-specific visual configuration is provided to and displayed on a device. The visualization includes inactive visuals that are activated based on various considerations.

20 Claims, 8 Drawing Sheets

(51) Int. Cl.
*G06F 8/61* (2018.01)
*G06F 9/445* (2018.01)

(58) Field of Classification Search
CPC ............ G06F 3/0488; G06F 17/30477; G06F 3/04817; G06F 3/0484; G06F 9/54; G06F 13/00; G06F 17/30554; G06F 17/30572; G06F 3/048; G06F 17/241; G06F 17/30991; G06F 21/31; G06F 8/65; G06F 17/30528; G06F 17/30091; G06F 17/30247; G06F 17/30174; G06F 17/3012; G06F 8/63; G06F 9/451; G06F 11/1464; G06F 11/3006; G06F 11/3089; G06F 17/30867; G06F 17/30876; G06F 3/04886; G06F 2203/04803; G06F 3/016; G06F 3/017; G06F 3/04847; G06F 16/24575; G06F 16/54; G06F 1/1677; G06F 9/00; G06F 9/44; G06F 16/44; G06F 9/4406; G06F 21/6245; G06F 3/147; G06F 16/288; G06F 16/904; G06F 21/41; G06F 3/1255; H04L 67/306; H04L 51/08; H04L 67/025; H04L 67/1095; H04L 67/02; H04L 67/10; H04L 41/22; H04L 63/102; H04L 67/18; H04L 67/26; H04L 67/42; H04L 63/104; H04L 67/22; G06Q 30/0269; G06Q 50/265; G06Q 10/06; H04N 21/4751

See application file for complete search history.

(56) References Cited

U.S. PATENT DOCUMENTS

| | | | | |
|---|---|---|---|---|
| 5,874,958 A * | 2/1999 | Ludolph | | G06F 9/4443 715/781 |
| 6,021,425 A | 2/2000 | Waldron, III et al. | | |
| 6,131,121 A * | 10/2000 | Mattaway | | H04L 1/0083 709/227 |
| 6,204,847 B1 * | 3/2001 | Wright | | G06F 9/4443 715/803 |
| 6,446,260 B1 | 9/2002 | Wilde et al. | | |
| 6,698,018 B1 | 2/2004 | Zimniewicz et al. | | |
| 6,724,403 B1 * | 4/2004 | Santoro | | G09G 5/14 715/765 |
| 6,950,991 B2 * | 9/2005 | Bloomfield | | G06F 9/4445 709/217 |
| 6,968,550 B2 | 11/2005 | Branson et al. | | |
| 6,990,238 B1 * | 1/2006 | Saffer | | G06F 17/30716 382/224 |
| 7,222,078 B2 * | 5/2007 | Abelow | | G06Q 10/0639 705/1.1 |
| 7,290,164 B1 * | 10/2007 | Harvey et al. | | 714/2 |
| 7,343,567 B2 * | 3/2008 | Mann | | G06F 3/0481 715/811 |
| 7,379,977 B2 * | 5/2008 | Walrath | | H04L 29/06 709/203 |
| 7,600,189 B2 * | 10/2009 | Fujisawa | | G09G 3/20 341/137 |
| 7,669,140 B2 | 2/2010 | Matthews et al. | | |
| 7,673,131 B2 | 3/2010 | Azzarello et al. | | |
| 7,673,255 B2 * | 3/2010 | Schechter | | G06F 9/4443 715/783 |
| 7,703,039 B2 * | 4/2010 | Agarwal | | G06F 3/0481 715/767 |
| 7,707,514 B2 * | 4/2010 | Forstall | | G06F 3/0486 715/741 |
| 7,761,800 B2 * | 7/2010 | Chaudhri | | B60K 35/00 715/764 |
| 7,849,453 B2 | 12/2010 | Tirumalai et al. | | |
| 7,885,981 B2 * | 2/2011 | Kaufman et al. | | 707/802 |
| 7,899,892 B2 * | 3/2011 | Tremblay | | H04L 67/125 709/220 |
| 7,954,064 B2 * | 5/2011 | Forstall | | G06F 3/04817 715/765 |
| 8,060,222 B2 * | 11/2011 | Eldridge et al. | | 700/83 |
| 8,078,970 B1 * | 12/2011 | Anderson | | G06F 17/5054 714/724 |
| 8,121,585 B2 | 2/2012 | Commarford et al. | | |
| 8,136,100 B1 * | 3/2012 | Goldman | | G06F 8/61 717/120 |
| 8,166,486 B2 | 4/2012 | Song et al. | | |
| 8,214,802 B1 | 7/2012 | Graves | | |
| 8,230,417 B1 * | 7/2012 | Clark | | G06F 8/61 709/220 |
| 8,245,934 B1 * | 8/2012 | Tam | | G06F 9/44505 235/435 |
| 8,261,253 B2 * | 9/2012 | Brehm | | G06F 8/61 714/15 |
| 8,296,682 B2 * | 10/2012 | Sloo | | 715/853 |
| 8,341,530 B1 * | 12/2012 | Inabinet | | G06Q 10/06 715/741 |
| 8,347,280 B2 * | 1/2013 | Swarna | | G07F 17/32 717/100 |
| 8,380,761 B2 * | 2/2013 | Johnson et al. | | 707/804 |
| 8,392,553 B2 * | 3/2013 | Petropoulakis | | G06F 11/3006 709/224 |
| 8,484,636 B2 * | 7/2013 | Mehta | | G06F 8/60 717/176 |
| 8,561,012 B1 * | 10/2013 | Holler | | G06F 9/44 717/102 |
| 8,646,060 B1 * | 2/2014 | Ben Ayed | | H04L 63/0853 726/9 |
| 8,700,722 B1 * | 4/2014 | Sharma | | G06F 17/30861 709/206 |
| 8,775,917 B2 * | 7/2014 | Bourke | | G06F 17/2247 715/200 |
| 8,793,575 B1 * | 7/2014 | Lattyak | | G09B 5/062 715/273 |
| 8,812,613 B2 * | 8/2014 | Keith, Jr. | | H04L 67/1095 709/203 |
| 8,819,025 B2 * | 8/2014 | De Bona | | G06F 8/60 707/740 |
| 8,825,663 B2 * | 9/2014 | Mahaniok | | G06F 8/60 707/741 |
| 8,856,670 B1 * | 10/2014 | Thakur | | G06F 9/4443 715/747 |
| 9,202,297 B1 * | 12/2015 | Winters | | G06T 11/206 |
| 9,280,483 B1 * | 3/2016 | Ghoshal | | H04W 8/183 |
| 9,319,406 B2 * | 4/2016 | Pardehpoosh | | H04L 63/0876 |
| 9,514,444 B2 * | 12/2016 | Moyers | | G06Q 10/107 |
| 9,646,317 B2 * | 5/2017 | John | | G06Q 30/0201 |
| 9,690,746 B1 * | 6/2017 | Hosea | | H04L 41/28 |
| 9,710,248 B2 | 7/2017 | Sawaya et al. | | |
| 10,088,990 B2 * | 10/2018 | Lynch | | G06F 9/44505 |
| 2002/0026436 A1 * | 2/2002 | Joory | | G06F 16/27 |
| 2002/0032763 A1 * | 3/2002 | Cox | | G06F 9/4443 709/223 |
| 2002/0086706 A1 * | 7/2002 | Chen | | H04L 29/06 455/560 |
| 2002/0090934 A1 * | 7/2002 | Mitchelmore | | H04L 29/06 455/412.2 |
| 2002/0124245 A1 * | 9/2002 | Maddux | | G06F 8/60 717/176 |
| 2002/0147766 A1 * | 10/2002 | Vanska | | G06F 21/6245 709/203 |
| 2003/0020671 A1 * | 1/2003 | Santoro | | G06F 3/0481 345/1.3 |
| 2003/0055927 A1 | 3/2003 | Fischer et al. | | |
| 2003/0144868 A1 * | 7/2003 | MacIntyre | | G06F 17/30536 705/7.38 |
| 2004/0032400 A1 * | 2/2004 | Freeman | | G06F 9/4443 345/173 |
| 2005/0075115 A1 * | 4/2005 | Corneille | | G06F 8/61 455/456.3 |
| 2006/0048184 A1 * | 3/2006 | Poslinski | | H04N 5/44543 725/45 |
| 2006/0069635 A1 * | 3/2006 | Ram | | G06Q 30/08 705/37 |

(56) References Cited

U.S. PATENT DOCUMENTS

| | | |
|---|---|---|
| 2006/0106881 A1 | 5/2006 | Leung et al. |
| 2006/0123413 A1 | 6/2006 | Collet et al. |
| 2006/0156271 A1* | 7/2006 | Goncharenko ........... G06F 8/60 717/100 |
| 2006/0190833 A1* | 8/2006 | SanGiovanni ...... G06F 3/04883 715/767 |
| 2007/0011268 A1* | 1/2007 | Banga ................. G06Q 30/02 709/217 |
| 2007/0064984 A1* | 3/2007 | Vassa .................. G06F 3/1454 382/128 |
| 2007/0083925 A1* | 4/2007 | Hargrave ................ H04L 41/08 726/14 |
| 2007/0101288 A1 | 5/2007 | Forstall et al. |
| 2007/0150886 A1* | 6/2007 | Shapiro .................... G06F 8/61 717/174 |
| 2007/0150891 A1* | 6/2007 | Shapiro .................... G06F 8/61 717/174 |
| 2007/0171450 A1* | 7/2007 | Yoshida .............. G06F 3/04817 358/1.13 |
| 2007/0188494 A1* | 8/2007 | Agutter ............ G06F 17/30554 345/440 |
| 2007/0233782 A1* | 10/2007 | Tali .......................... G06F 8/61 709/203 |
| 2007/0233853 A1* | 10/2007 | Sarma ..................... H04L 41/22 709/224 |
| 2007/0240150 A1 | 10/2007 | Gangwar et al. |
| 2007/0282951 A1* | 12/2007 | Selimis .................. H04L 67/06 709/205 |
| 2008/0028389 A1* | 1/2008 | Genty ....................... G06F 8/61 717/174 |
| 2008/0120543 A1* | 5/2008 | Cahill ................. G06F 11/3466 715/700 |
| 2008/0195948 A1* | 8/2008 | Bauer ....................... G06F 3/048 715/719 |
| 2008/0250122 A1* | 10/2008 | Zsigmond ............... H04L 67/34 709/220 |
| 2008/0250405 A1* | 10/2008 | Farhangi .................. G06F 8/61 717/177 |
| 2008/0301672 A1* | 12/2008 | Rao .......................... G06F 8/61 717/177 |
| 2009/0083703 A1* | 3/2009 | Grady .................... G06Q 10/10 717/109 |
| 2009/0113334 A1* | 4/2009 | Chakra .................. G06F 9/4443 715/772 |
| 2009/0124394 A1* | 5/2009 | Swarna .................. G07F 17/32 463/43 |
| 2009/0132942 A1* | 5/2009 | Santoro ................ G06F 3/0481 715/765 |
| 2009/0213844 A1* | 8/2009 | Hughston ........... H04M 3/4872 370/352 |
| 2009/0254529 A1* | 10/2009 | Goldentouch ........ G06F 17/241 |
| 2009/0265702 A1* | 10/2009 | Lu ............................ G06F 8/61 717/174 |
| 2009/0282146 A1 | 11/2009 | Nakano |
| 2009/0300544 A1* | 12/2009 | Psenka .............. G06F 17/30554 715/810 |
| 2010/0080365 A1* | 4/2010 | Seetharaman ....... H04M 1/7255 379/88.22 |
| 2010/0088634 A1* | 4/2010 | Tsuruta .................. G06F 3/0481 715/800 |
| 2010/0107150 A1* | 4/2010 | Kamada ................... G06F 8/65 717/170 |
| 2010/0146442 A1* | 6/2010 | Nagasaka ............... G06Q 10/10 715/810 |
| 2010/0251187 A1* | 9/2010 | Tseng ....................... G06F 8/34 715/853 |
| 2010/0262953 A1* | 10/2010 | Barboni ................... G06F 8/61 717/120 |
| 2010/0306762 A1* | 12/2010 | Lindberg ................. G06F 8/61 717/176 |
| 2010/0311391 A1* | 12/2010 | Siu ....................... H04W 8/205 455/411 |
| 2010/0325578 A1* | 12/2010 | Mital .................... G06T 19/20 715/805 |
| 2011/0010699 A1 | 1/2011 | Cooper et al. |
| 2011/0061010 A1* | 3/2011 | Wasko ................. G06F 3/0482 715/769 |
| 2011/0078332 A1 | 3/2011 | Poon |
| 2011/0117881 A1* | 5/2011 | Luoma .................... H04L 63/08 455/410 |
| 2011/0184804 A1* | 7/2011 | Sontag ................. G06F 21/335 705/14.49 |
| 2011/0225178 A1 | 9/2011 | Ingrassia et al. |
| 2011/0251992 A1* | 10/2011 | Bethlehem .......... H04L 12/2863 707/610 |
| 2011/0258049 A1* | 10/2011 | Ramer ............. G06F 17/30867 705/14.66 |
| 2011/0258566 A1* | 10/2011 | Oustiougov .......... G06F 3/0483 715/766 |
| 2011/0283231 A1* | 11/2011 | Richstein ............... G06F 3/0488 715/810 |
| 2011/0302570 A1 | 12/2011 | Kurimilla et al. |
| 2012/0004975 A1* | 1/2012 | Satyavolu ............... G06Q 30/02 705/14.27 |
| 2012/0032945 A1* | 2/2012 | Dare ....................... G06F 3/0481 345/418 |
| 2012/0053986 A1* | 3/2012 | Cardno ............. G06Q 30/0201 705/7.29 |
| 2012/0054653 A1* | 3/2012 | Grossman ............. G06F 3/0482 715/764 |
| 2012/0079095 A1* | 3/2012 | Evans ....................... G06F 8/61 709/224 |
| 2012/0084715 A1* | 4/2012 | Sirpal ...................... G06F 1/1616 715/790 |
| 2012/0089974 A1* | 4/2012 | Cho .......................... G06F 8/61 717/173 |
| 2012/0102433 A1* | 4/2012 | Falkenburg ......... G06F 9/45529 715/835 |
| 2012/0123865 A1* | 5/2012 | Salzano ............. G06Q 30/0257 705/14.55 |
| 2012/0144335 A1* | 6/2012 | Abeln ..................... G06Q 10/06 715/771 |
| 2012/0185842 A1 | 7/2012 | Sriperumbudur et al. |
| 2012/0203862 A1* | 8/2012 | Tayeb ....................... G06F 8/61 709/217 |
| 2012/0218254 A1* | 8/2012 | Abeln ..................... G06T 11/206 345/419 |
| 2012/0246137 A1* | 9/2012 | Sallakonda ......... G06F 16/4393 707/709 |
| 2012/0303756 A1 | 11/2012 | Bolohan et al. |
| 2012/0324481 A1 | 12/2012 | Xia et al. |
| 2013/0007662 A1* | 1/2013 | Bank ...................... G06F 9/451 715/811 |
| 2013/0018939 A1 | 1/2013 | Chawla et al. |
| 2013/0019237 A1* | 1/2013 | Pardehpoosh ..... G06Q 30/0609 717/171 |
| 2013/0036200 A1* | 2/2013 | Roberts ............... H04L 65/4076 709/219 |
| 2013/0086577 A1 | 4/2013 | Nakashima et al. |
| 2013/0097516 A1* | 4/2013 | Hong .................... H04L 67/306 715/739 |
| 2013/0113750 A1* | 5/2013 | Miyahara ................ G06F 3/041 345/173 |
| 2013/0132938 A1 | 5/2013 | Agarwal et al. |
| 2013/0159995 A1 | 6/2013 | Senot et al. |
| 2013/0187926 A1* | 7/2013 | Silverstein ........... G06Q 10/105 345/440 |
| 2013/0205217 A1 | 8/2013 | Schuller |
| 2013/0219381 A1* | 8/2013 | Lovitt ....................... G06F 8/65 717/173 |
| 2013/0247202 A1* | 9/2013 | Yablokov ................ G06F 21/561 726/24 |
| 2013/0275509 A1 | 10/2013 | Micucci et al. |
| 2013/0275553 A1 | 10/2013 | Shilo et al. |
| 2013/0297807 A1* | 11/2013 | Chavis ..................... G06F 9/54 709/227 |
| 2013/0332846 A1 | 12/2013 | Freedman |

(56) References Cited

U.S. PATENT DOCUMENTS

| | | | |
|---|---|---|---|
| 2013/0332886 A1* | 12/2013 | Cranfill | G06F 3/0482 715/835 |
| 2014/0007084 A1 | 1/2014 | Ding | |
| 2014/0115116 A1 | 4/2014 | Motes et al. | |
| 2014/0115490 A1* | 4/2014 | Yamasani | G06F 21/604 715/743 |
| 2014/0201144 A1 | 7/2014 | Vibhor et al. | |
| 2014/0229436 A1 | 8/2014 | Wang et al. | |
| 2014/0229438 A1 | 8/2014 | Carriero et al. | |
| 2014/0245203 A1* | 8/2014 | Lee | G06F 3/04817 715/765 |
| 2014/0258350 A1 | 9/2014 | Duval et al. | |
| 2014/0287818 A1 | 9/2014 | Chan et al. | |
| 2014/0289190 A1 | 9/2014 | Chan | |
| 2014/0297771 A1 | 10/2014 | Kotamarti | |
| 2014/0298214 A1 | 10/2014 | Machalani et al. | |
| 2014/0309870 A1* | 10/2014 | Ricci | H04W 4/21 701/36 |
| 2014/0359469 A1 | 12/2014 | Alphin, III et al. | |
| 2014/0359602 A1* | 12/2014 | Sawaya | G06F 8/61 717/176 |
| 2015/0142983 A1 | 5/2015 | Yilmaz et al. | |
| 2015/0244741 A1 | 8/2015 | Sinha et al. | |
| 2015/0281754 A1* | 10/2015 | Deen | H04N 21/25891 725/37 |
| 2015/0334182 A1 | 11/2015 | Wu et al. | |
| 2016/0085763 A1* | 3/2016 | Tatourian | H04L 67/10 707/662 |
| 2017/0102930 A1 | 4/2017 | Sawaya et al. | |
| 2018/0007099 A1* | 1/2018 | Ein-Gil | H04L 63/08 |
| 2018/0196865 A1* | 7/2018 | Rabin | H04L 63/0428 |
| 2019/0281095 A1* | 9/2019 | Ein-Gil | H04L 67/14 |

FOREIGN PATENT DOCUMENTS

| | | |
|---|---|---|
| CN | 102542410 | 7/2012 |
| CN | 102693495 | 9/2012 |
| EP | 1227399 | 7/2002 |
| WO | WO-9963434 | 12/1999 |
| WO | WO-2012032137 | 3/2012 |

OTHER PUBLICATIONS

"Optimize Windows 7 for better performance", Retrieved from <http://windows.microsoft.com/en-au/windows7/optimize-windows-7-for-better-performance> on Mar. 1, 2013, (Feb. 12, 2010), 4 Pages.

Black, Aaron "Streaming Execution Mode", Retrieved from <http://www.vmware.com/files/pdf/VMware_ThinApp_Streaming_Execution_Mode_Information_Guide.pdf> on Mar. 1, 2013, (2011), 8 pages.

Knowlton, Gray "Click-to-Run and Office on Demand", Retrieved from <http://blogs.office.com/b/office-next/archive/2012/08/27/click-to-run-and-office-on-demand.aspx> on Mar. 1, 2013, (Aug. 27, 2012), 8 pages.

Sneedon, Joey-Elijah "'Test Drive' offers install-free app try-outs in Ubuntu 11.04", Retrieved from <http://www.omgubuntu.co.uk/2011/03/test-drive-offers-install-free-app-try-outs-in-ubuntu-11-04> on Mar. 1, 2013, (Mar. 27, 2011),10 pages.

"International Search Report and Written Opinion", Application No. PCT/US2013/061079, dated Jan. 24, 2014, 10 pages.

"International Search Report and Written Opinion", Application No. PCT/US2013/058666, dated Jan. 23, 2014, 11 pages.

"International Search Report and Written Opinion", Application No. PCT/US2013/060249, dated Jan. 2, 2014, 12 pages.

"Application Install and Layout Syncing", U.S. Appl. No. 13/904,929, 39 pages.

"Visual Configuration and Activation", U.S. Appl. No. 13/854,025, 45 pages.

Roche, Didier "OneConf in Oneiric and the way forward", Retrieved at «http://blog.didrocks.fr/post/OneConf-in-Oneiric-and-the-way-forward%E2%80%A6», (Oct. 5, 2011), 5 Pages.

Tu, Hoang "How to Sync Apps Across Devices and How to Turn Off Windows Store", Retrieved at «http://dottech.org/91287 /windows-8-how-to-turn-off-windows-store-and-how-to-sync-apps-across-devices/> >, (Dec. 28, 2012), 4 Pages.

"Non-Final Office Action", U.S. Appl. No. 13/905,121, dated Jun. 1, 2015, 14 pages.

"Restriction Requirement", U.S. Appl. No. 13/904,929, dated Mar. 27, 2015, 6 pages.

"Final Office Action", U.S. Appl. No. 13/905,121, dated Nov. 19, 2015, 14 pages.

"Final Office Action", U.S. Appl. No. 13/904,929, dated Oct. 19, 2016, 12 pages.

"Foreign Office Action", EP Application No. 13766778.8, dated Nov. 11, 2016, 6 pages.

"Non-Final Office Action", U.S. Appl. No. 13/905,121, dated May 26, 2016, 19 pages.

"Non-Final Office Action", U.S. Appl. No. 13/904,929, dated Apr. 11, 2016, 20 pages.

"Office Action Issued in European Patent Application No. 13766778.8", dated Sep. 29, 2017, 5 Pages.

"Non-Final Office Action Issued in U.S. Appl. No. 13/905,121" dated Oct. 17, 2017, 21 Pages.

"Non-Final Office Action", U.S. Appl. No. 15/382,749, dated Jun. 2, 2017, 18 pages.

"Foreign Office Action", EP Application No. 13771336.8, dated May 10, 2017, 4 pages.

"Notice of Allowance", U.S. Appl. No. 13/904,929, dated Mar. 10, 2017, 12 pages.

"Final Office Action", U.S. Appl. No. 13/905,121, dated Feb. 7, 2017, 23 pages.

"Foreign Office Action", CN Application No. 201380076965.2, dated Feb. 5, 2018, 16 pages.

"Final Office Action", U.S. Appl. No. 13/905,121, dated Jun. 7, 2018, 25 pages.

"Foreign Office Action", EP Application No. 13766778.8, dated Jun. 1, 2018, 5 pages.

"First Office Action and Search Report Issued in Chinese Patent Application No. 201380075240.1", dated Feb. 11, 2018, 11 Pages.

"IOS: How to Back Up", Retrieved From: http://www.web.archive.org/web/20130308013457/http://support.apple.com/kb/HT1766, Feb. 20, 2013, 4 Pages.

"Office Action Issued in European Patent Application No. 13783708.4", dated Nov. 16, 2018, 6 Pages.

"Second Office Action Issued in Chinese Patent Application No. 201380075240.1", dated Oct. 10, 2018, 11 Pages.(W/O English Translation).

"Second Office Action Issued in Chinese Patent Application No. 201380076965.2", dated Sep. 26, 2018, 10 Pages.

Crump, Mark, "iOS: Set Up and Restore from iCioud Backup", Retrieved From: http://gigaom.com/2011/10/18/ios-101-set-up-and-restore-from-icloud-backup/, Oct. 18, 2011, 13 Pages.

"International Search Report and Written Opinion Issued in PCT Application No. PCT/US2013/058666", dated Jan. 24, 2014, 11 Pages.

"Office Action Issued in European Patent Application No. 137766778.8", dated Dec. 14, 2018, 5 pages.

Non Final Office Action Issued in U.S. Appl. No. 13/905,121, dated Jan. 10, 2019, 19 Pages.

"Third Office Action Issued in Chinese Patent Application No. 201380075240.1", dated May 10, 2019, 29 Pages.

"Office Action Issued in European Patent Application No. 13766778.8", dated Aug. 9, 2019, 05 Pages.

"Scheduling of Processes", Retrieved From: https://web.archive.org/web/20130308102912/http://www2.cs.uregina.ca/~hamilton/courses/330/notes/scheduling/scheduling.html, Mar. 8, 2013, 9 Pages.

"Office Action Issued in European Patent Application No. 13766778.8", dated Mar. 9, 2020, 5 Pages.

* cited by examiner

VISUAL CONFIGURATION AND ACTIVATION

BACKGROUND

Today's computing devices provide users with rich user experiences. For example, users can utilize applications to perform tasks, such as word processing, email, web browsing, communication, and so on. Further, users can access a variety of content via a computing device, such as video, audio, text, and so on. Thus, computing devices provide a platform for access to a diverse array of functionalities and content.

To assist users in accessing various functionalities and/or content, computing devices typically present selectable graphical elements (e.g., icons) that represent functionalities and/or content. For example, a user can select a graphical element to launch an application, access an instance of content, access a computing resource, and so on. While such graphical elements enable convenient access to functionalities and content, organization and presentation of graphical elements in a display space presents challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for visual configuration and activation are described. Generally, a visual is a graphical representation that is selectable via user input to invoke various functionalities (e.g., applications, services, and so on), open instances of content, access resources (e.g., computer hardware resources), and so forth. Techniques discussed herein enable visuals to be presented to a user based on a user-specific visual configuration. The visuals are then activated such that visuals are selectable to access various functionalities.

In at least some embodiments, a visualization that represents a user-specific visual configuration is provided to and displayed on a device. In one or more embodiments, at least some visuals of the visual configuration are inactive. An inactive visual, for example, corresponds to a visual for which functionality is not presently downloaded, installed, and/or registered. Activation of at least some of the inactive visuals is initiated, such as by downloading and/or installing functionality for the inactive visuals.

In at least some embodiments, a visual representation is updated to reflect visual activation progress for inactive visuals. Visual activation, for example, can occur in a particular activation order. According to various embodiments, activation order can be changed based on various events, such as user selection of a visual.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
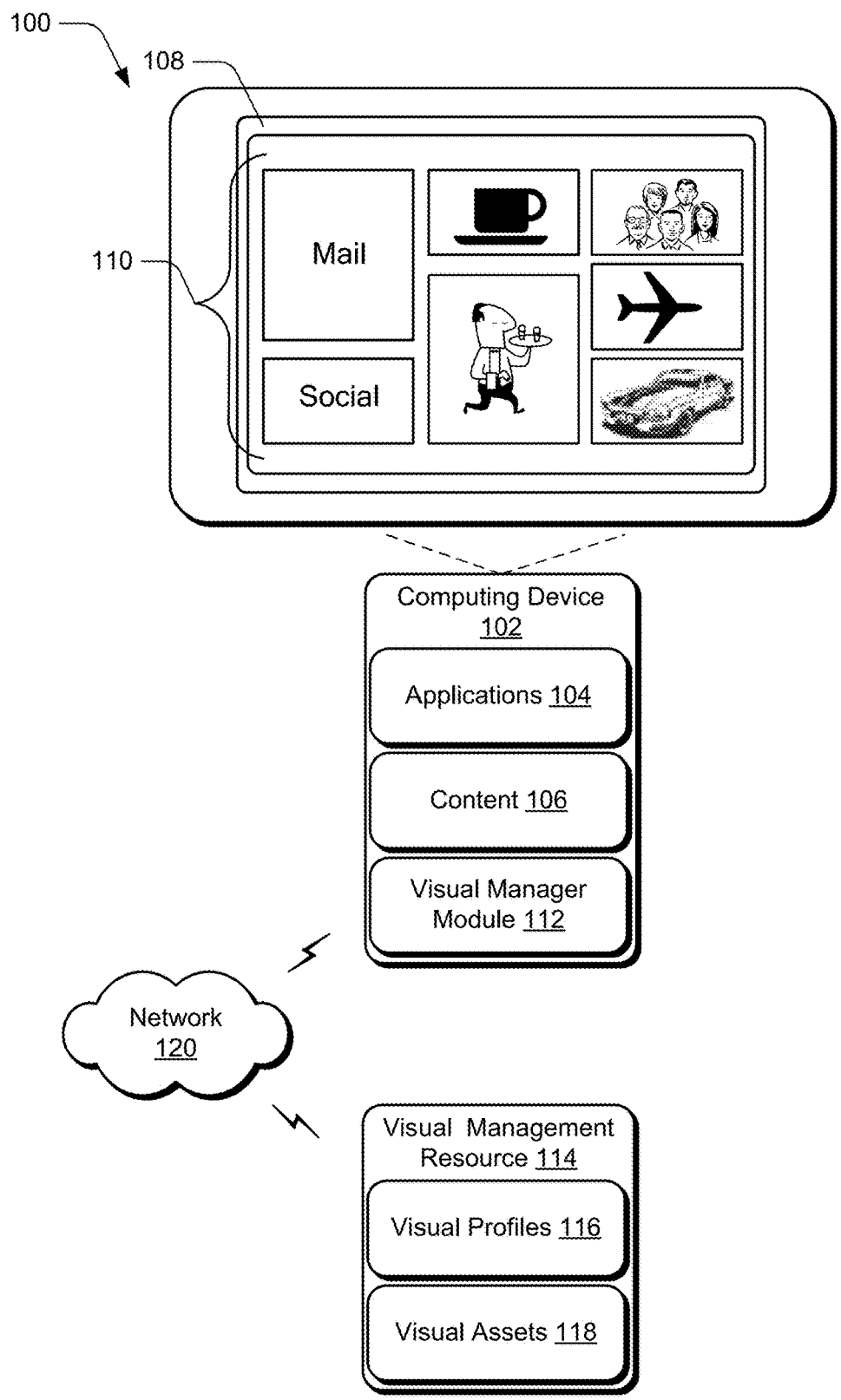
FIG. 1 is an illustration of an environment in an example implementation that is operable to employ techniques discussed herein.

Techniques for visual configuration and activation are described. Generally, a visual is a graphical representation that is selectable via user input to invoke various functionalities (e.g., applications, services, and so on), open instances of content, access resources (e.g., computer hardware resources), and so forth. Examples of visuals include icons, tiles, and so forth. Techniques discussed herein enable visuals to be presented to a user based on a user-specific visual configuration. The visuals are then activated such that visuals are selectable to access various functionalities.

For instance, consider a scenario where a user purchases a new device. The user turns the device on and performs a login procedure. Responsive to the login, a user-specific visual configuration is retrieved, such as from a network resource. The visual configuration, for example, can correspond to a visual configuration from a different device associated with the user. For instance, the user may have purchased the new device to replace an old device. Thus, a visual configuration from the old device can be tracked by a network resource, and propagated to the new device.

A visualization for the visual configuration is generated. The visualization includes graphics for visuals included in the visual configuration. The visualization is provided to and displayed on the new device. In one or more embodiments, at least some of the visuals are inactive. An inactive visual, for example, corresponds to a visual for which functionality is not presently downloaded, installed, and/or registered. Activation of at least some of the inactive visuals is initiated, such as by downloading and/or installing functionality for the inactive visuals. Thus, the user is presented with a familiar visual configuration that includes some preview visuals that are inactive and thus represent functionality that can be activated.

In at least some embodiments, a visualization of a visual configuration is updated to reflect visual activation progress for inactive visuals. For example, an inactive visual can include a progress indicator that indicates a relative level of activation progress, such as download progress, installation progress, registration progress, and so forth. When the visual becomes active, the visual can be visually distinguished from other visuals that are inactive. Thus, an active visual is selectable to access represented functionality, such as an application, content, services, resources, and so forth.

In at least some embodiments, visual activation can occur in a particular activation order. For example, inactive visuals can be activated based on a visual order in a display, such as from left to right, top to bottom, right to left, and/or any combination thereof. Activation order can be based on other considerations, such as a user-indicated visual priority. According to various embodiments, activation order can be changed based on various events, such as user selection of a visual.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example methods in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for visual configuration and activation described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device (e.g., a tablet), and so forth as further described in relation to FIG. 8.

The computing device 102 includes applications 104 and content 106. The applications 104 are representative of functionalities to perform various tasks via the computing device 102. Examples of the applications 104 include a word processor application, an email application, a content editing application, a web browsing application, and so on. The content 106 is representative of instances of content that can be consumed via the computing device 102, such as images, video, audio, and so forth.

A display 108 is illustrated, which is representative of a device that is configured to output graphics for the computing device 102. Displayed on the display 108 are visuals 110, which are visual representations of functionalities, content, resources, and so forth. For instance, individual of the visuals 110 can be associated with respective instances of the applications 104 and/or the content 106. User selection of an individual of the visuals 110 can cause one of the applications 104 to be launched, an instance of the content 106 to be presented, and so on. Thus, as discussed herein, a visual generally refers to a graphical element that is selectable to cause a variety of different actions to occur, such as launching an application, initiating playback of content, accessing a device, and so forth.

In at least some embodiments, the visuals 110 are displayed on the display 108 as part of a primary screen of the computing device 102. The visuals 110, for example, can be automatically presented as part of a first screen that is displayed when the computing device 102 is powered on (e.g., booted) from a power off state.

The computing device 102 further includes a visual manager module 112, which is representative of functionality to manage various aspects and attributes of the visuals 110. For instance, the visual manager module 112 can include functionality for implementing techniques for visual configuration and activation discussed herein. Further functionalities of the visual manager module 112 are discussed below.

The environment 100 further includes a visual management resource 114, which is representative of resource that is remote from the computing device 102 and that can provide various visual-related services for the computing device 102. For instance, the visual management resource 114 can provide visuals, applications, content, and so forth, to the computing device 102, such as via download and/or upload. The visual management resource 114 may also manage various visuals processes, such as tracking changes to visual configuration of the computing device 102.

The visual management resource 114 includes visual profiles 116, which are representative of functionality to track visual configurations for different devices. For instance, consider that a user of the computing device 102 generates a custom visual configuration on the computing device 102. The user, for example, can add visuals, delete visuals, rearrange visuals to different positions on the display 108, and so on. Such changes to visual configuration on the computing device 102 can be stored as a user-specific visual profile via the visual profiles 116. As detailed herein, tracking a visual profile for a user enables the visual profile to be automatically applied to various devices, such as a different device than the computing device 102.

The visual management resource further includes visual assets 118, which are representative of various types of graphics that can be accessed to generate visuals. For example, in response to a request from the computing device 102 for a visual, the visual management resource 114 can utilize the visual assets 118 to generate a visual configuration that corresponds to a particular visual profile of the visual profiles 116. The visual configuration can be provided to the computing device 102. As detailed herein, the visual configuration can include preview visuals that are displayable on the computing device 102 to represent functionality that is not yet active.

A network 120 is provided, which enables communication between the computing device 102, the visual management resource 114, and various other entities. The network 120 can be implemented as a single network or a combination of different networks. Examples of the network 120 include a local area network (LAN), a wide area network (WAN), the Internet, and so forth.

Having described an example environment in which the techniques described herein may operate, consider now some example implementation scenarios in accordance with one or more embodiments.

Example Implementation Scenarios

The following discussion describes some example implementation scenarios for visual configuration and activation in accordance with one or more embodiments. The example implementation scenarios may be employed in the environment 100 of FIG. 1, the system 800 of FIG. 8, and/or any other suitable environment.

Figure 2:
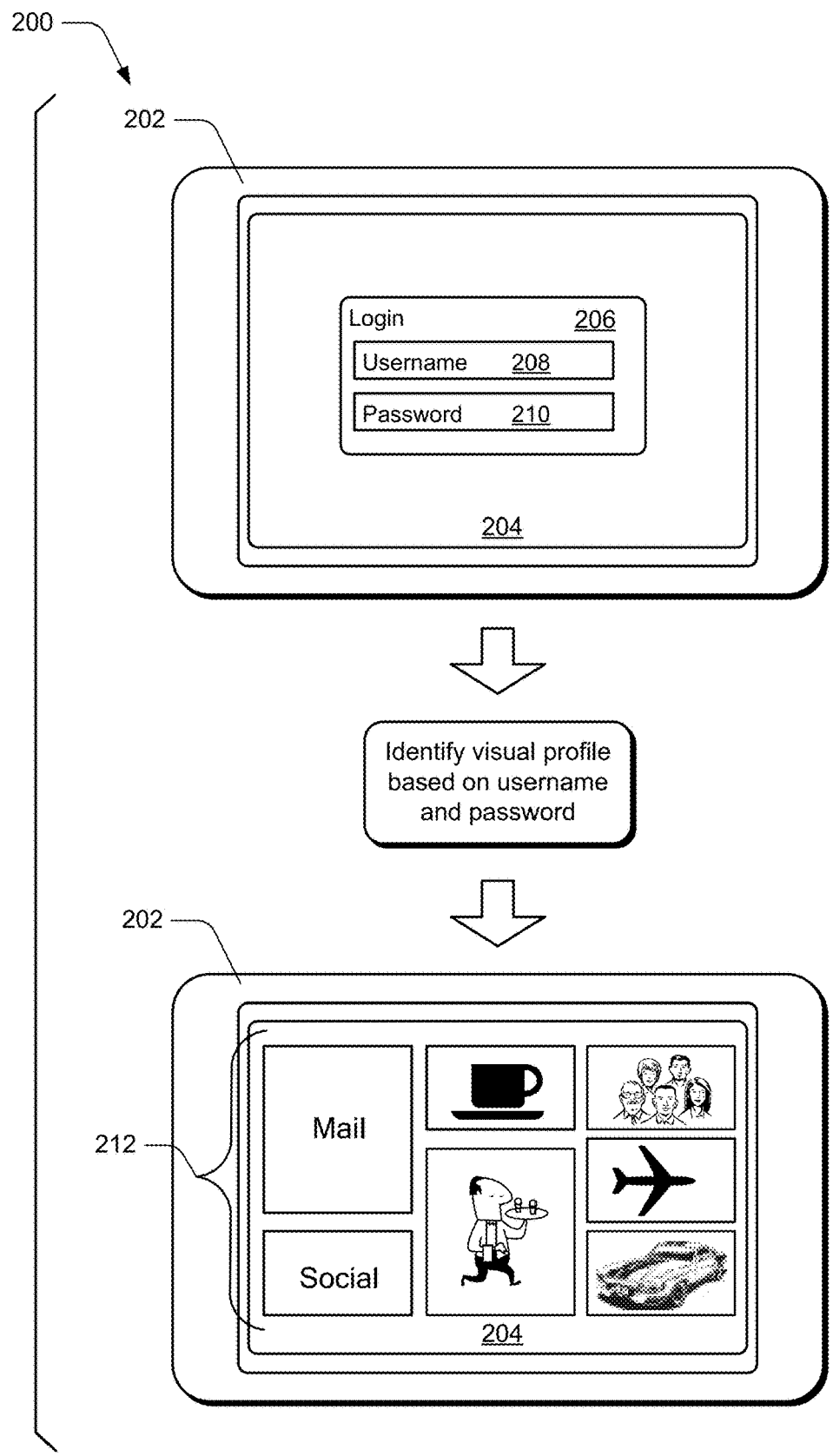
FIG. 2 illustrates an example implementation scenario in accordance with one or more embodiments.

FIG. 2 illustrates an example implementation scenario, generally at 200. The upper portion of the scenario 200 includes a display 202 with a display area 204 in which various graphical elements can be displayed. The display area 204 displays a login window 206, which enables a user to provide various identification and/or authentication information. In this example, the login window 206 includes a username portion 208 in which a user can provide a user name and/or other identifier that can distinguish the user from other users. The login window 206 further includes a password portion 210 in which a user can enter a password that can authenticate the user to a user profile associated with a username provided to the username portion 208. The username/password combination illustrated in the scenario 200 is presented for purpose of example only, and a wide variety of different identification, authentication, and/or authorization techniques can be employed in accordance with the claimed embodiments.

Proceeding to the center portion of the scenario 200, a user provides a username and password, and a visual profile for the user is identified. The visual profile, for example, can be associated with a user account for the user with a particular entity and/or service. For instance, the username and password can identify an instance of a visual profile from the visual profiles 116 managed by the visual management resource 114.

Continuing to the lower portion of the scenario 200, a visual configuration 212 is retrieved and displayed in the display area 204. The visual configuration 212 includes a particular collection and arrangement of visuals. The visual configuration 212, for example, can be specific to a particular user and/or user account. Thus, the visual configuration 212 is visual representation of a collection of applications, content, services, resources, and so forth, that is customized by and/or for a particular user and/or user account.

The scenario 200 can occur in various situations. For example, when a user purchases or is given a new device, the user can perform an authentication process. In response to a successful authentication process, a visual configuration for the user can be located (e.g., the by visual management resource 114) and provided to the new device. Thus, the scenario 200 can represent a first interaction by a particular user with a particular device.

Another situation in which the scenario 200 may occur is a reconfiguration and/or recovery of a previously-configured device. A user, for instance, can authenticate via a device that was previously configured with a different configuration, e.g., visual configuration. As another example, a user can authenticate via a device that experienced a failure such that some or all configuration data was lost or corrupted. In response to successful authentication, a visual configuration for the user can be located (e.g., the by visual management resource 114) and used to reconfigure the device. These situations are presented for purpose of illustration only, and the scenario 200 can occur in a wide variety of different situations in accordance with the claimed embodiments.

In at least some embodiments, the visual configuration 212 can be displayed even though functionalities represented by some of the visuals may not yet be available. For instance, consider the following implementation scenario.

Figure 3:
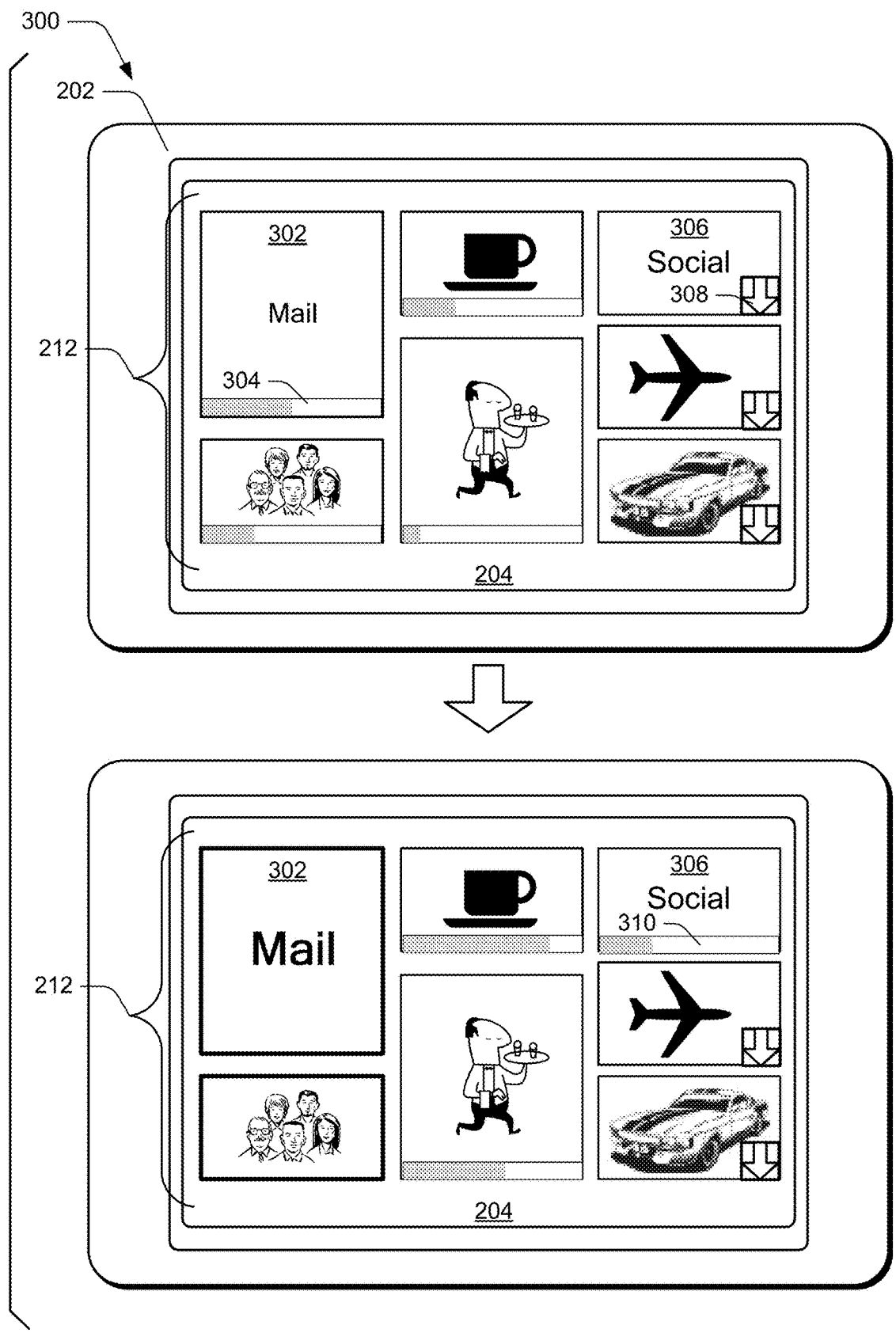
FIG. 3 illustrates an example implementation scenario in accordance with one or more embodiments.

FIG. 3 illustrates an example implementation scenario, generally at 300. In the upper portion of the scenario 300, the visual configuration 212 is displayed in the display area 204 of the display 202, introduced above.

As referenced above, when the visual configuration 212 is first displayed (e.g., in response to an initial user authentication), functionality associated with at least some of the visuals may not be immediately available. For example, the visual configuration 212 can be displayed to provide a user with a familiar view of the user's primary screen, while functionalities associated with the individual visuals are downloaded in the background. Consider, for instance, the following aspects of the visual configuration 212.

The visual configuration 212 includes a visual 302, which is a visual representation of email functionality. When the visual 302 is active, for example, the visual 302 can be selected to launch and/or access an email application.

The visual 302 includes a progress indicator 304, which indicates an activation progress for the visual 302. For instance, the progress indicator 304 can be implemented as a progress bar that provides a visual indication of a download and/or install progress for an application or other resource associated with the visual 302. Thus, the progress indicator 304 can indicate that the visual 302 is not currently active, but is in the process of being activated. Various other types of progress indicators may additionally or alternatively be employed in accordance with the claimed embodiments.

The visual configuration 212 further includes a visual 306, which is a visual representation of a social media resource. When the visual 306 is active, for example, the visual 306 can be selected to launch and/or access a social media application, a social media website, and so forth.

The visual 306 includes an inactive indicator 308 that provides a visual indication that the visual 306 and its underlying functionality is currently inactive. The inactive indicator 308 can further indicate that underlying functionality is not currently being activated, e.g., in the process of being downloaded and/or installed.

In at least some embodiments, the visual 306 is selectable to initiate visual activation. For example, user selection of the visual 306 can cause a download and/or installation of underlying functionality to be initiated. If activation of the visual 306 is initiated, the inactive indicator 308 can be replaced with a progress indicator in the visual 306 to indicate an activation progress for the visual 306. As detailed below, selection and/or manipulation of the visual 306 can cause the visual 306 to be promoted in an activation order such that the visual 306 is activated before other visuals in the visual configuration 212.

Thus, the visuals 302, 306 may be considered "preview visuals" that present a visual indication of a functionality that is not currently active but that may become active.

Proceeding to the lower portion of the scenario 300, activation of the visual 302 is completed. Thus, the progress indicator 304 is removed to indicate that the visual 302 is active, e.g., selectable to initiate an underlying functionality. Activation of the visual 302 causes other changes to the visual appearance of the visual 302. For example, the visual 302 can be visually emphasized, such as by increasing font size for text in the visual, visually bolding various visual aspects of the visual, and so forth.

The color of the visual 302 may also be changed to indicate that the visual is active. For instance, before the visual 302 is active (e.g., as indicated in the upper portion of the scenario 300), the visual 302 can be displayed in greyscale. When the visual becomes active, the visual can change to being displayed in color. Thus, various ways of visually distinguishing active visuals from inactive visuals can be employed.

Further illustrated in the lower portion of the scenario 300 is that the visual 306 is currently being activated, as indicated by a progress indicator 310 displayed as part of the visual 306. Activation of the visual 306 can be initiated in response to a number of different events. For example, user selection of the visual 306 in an inactive state can initiate activation of the visual 306.

As another example, initiation of activation of the visual 306 can be based on activation progress for other visuals of the visual configuration 212. Activation of visuals of the visual configuration 212, for instance, can be performed based on a specific activation order for the visuals. In at least some embodiments, initiation of activation of the visual 306 may not be initiated until another visual reaches a particular activation progress and/or is activated. Further details concerning activation order are presented below.

Thus, the scenario 300 illustrates that a user can be presented with a full fidelity visual of a visual configuration for the user, such as in response to an initial user authentication with a device. While the visual of the visual configuration is presented, visuals can progressively be activated to enable access to various functionalities associated with the visuals. Such incremental activation enables a user to view a familiar operating environment, and to select visuals to access underlying functionalities as the visuals become active.

Having described some example implementation scenarios in which the techniques described herein may operate, consider now some example procedures in accordance with one or more embodiments.

Example Procedures

The following discussion describes some example procedures for visual configuration and activation in accordance with one or more embodiments. The example procedures may be employed in the environment 100 of FIG. 1, the system 800 of FIG. 8, and/or any other suitable environment. In at least some embodiments, the aspects of the procedures can be implemented by the visual manager module 112 and/or the visual management resource 114.

Figure 4:
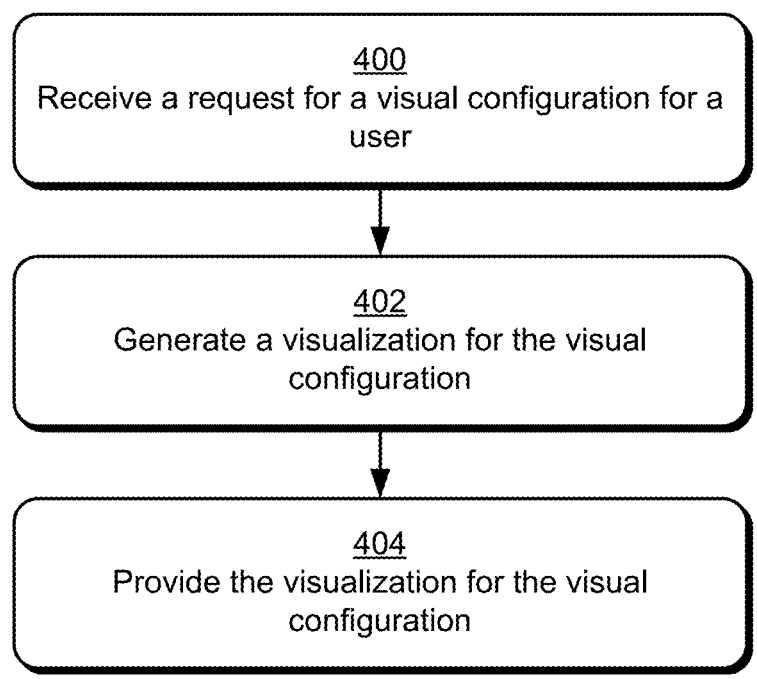
FIG. 4 is a flow diagram that describes steps in a method in accordance with one or more embodiments.

FIG. 4 is a flow diagram that describes steps in a method in accordance with one or more embodiments. Step 400 receives a request for a visual configuration for a user. The request, for example, can be generated in response to an initial user login to a device. A variety of other events can initiate the request, however, such as a device recovery process, a device reconfiguration process, and so on. With reference to the environment 100, the visual manager module 112 can generate the request and send the request to the visual management resource 114.

Step 402 generates a visualization for the visual configuration. The visual management resource 114, for instance, can search the visual profiles 116 for a visual configuration associated with a specific user. The visualization can be generated to include graphics for individual visuals of the visual configuration, such as using graphics assets from the visual assets 118.

Step 404 provides the visualization for the visual configuration. For example, the visual management resource 114 can transmit the visualization to a requesting device, e.g., the computing device 102.

Figure 5:
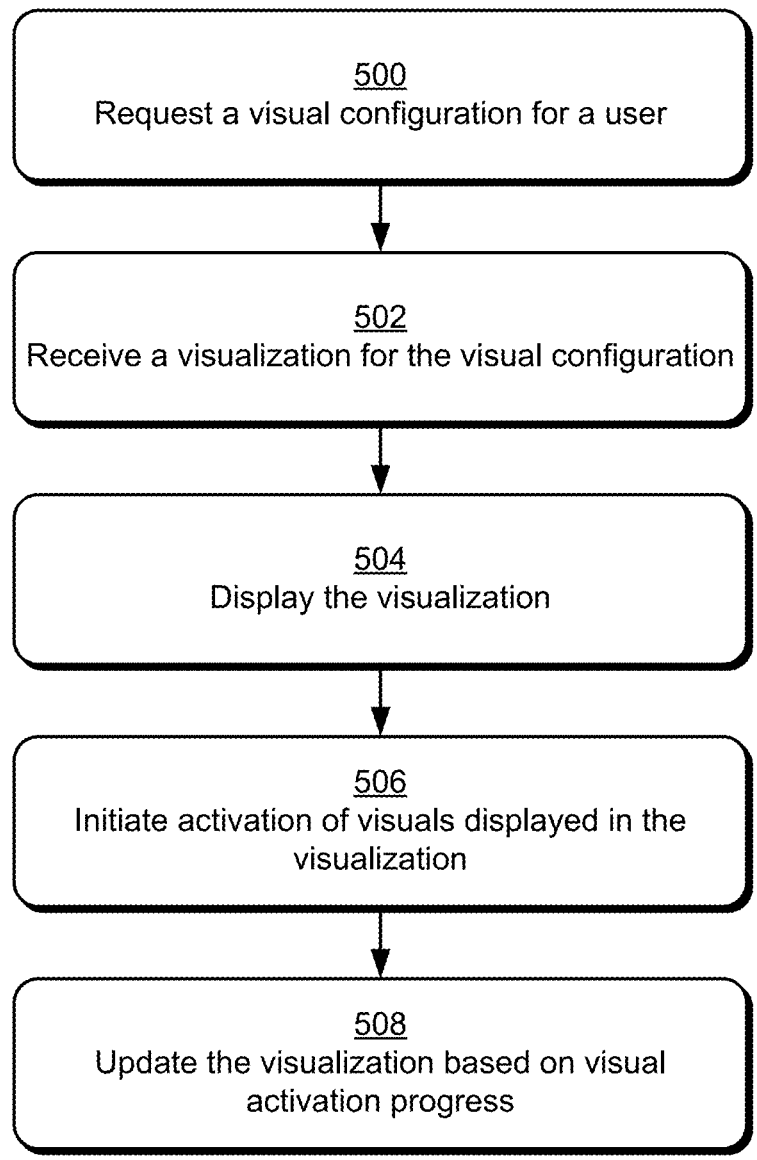
FIG. 5 is a flow diagram that describes steps in a method in accordance with one or more embodiments.

FIG. 5 is a flow diagram that describes steps in a method in accordance with one or more embodiments. Step 500 requests a visual configuration for a user. As discussed elsewhere herein, the visual configuration can be requested based on various events.

Step 502 receives a visualization for the visual configuration. The visualization, for instance, can include displayable graphics.

Step 504 displays the visualization. As discussed above, at least some of the visuals displayed as part of the visualization can be preview visuals that represent functionality that is not currently available.

Step 506 initiates activation of visuals displayed in the visualization. For example, download, installation, and/or registration processes for functionalities represented by the visuals can be initiated. As illustrated above, individual visuals can include visual indications of activation progress.

As referenced above, visual activation can be based on a particular activation order. For example, activation order can be based on a visual order of visuals in a display, such as from left to right, from top to bottom, and/or any other specified visual order. Thus, visuals in one visual region may be activated before visuals in another visual region.

In another example, activation order may be based on visual priority, with higher priority visuals being activated before lower priority visuals. Visual priority can be specified in various ways. For example, an entity can specify the activation order, such as the visual manager module 112 and/or the visual management resource 114.

As another example, activation order can be expressly or implicitly indicated by a user. For instance, a user can provide input expressly specifying an order in which visuals are to be activated. Activation priority can be implied from user actions, such as user interactions with visuals on a different device and/or on a previous configuration of a current device. Implied activation priority, for instance, can be implied based on visuals most often selected by a user, applications that a user interacts with most often, content that a user views most often, and so forth. Thus, visuals can be ranked based on a level of user interaction, with higher ranked visuals activated before lower ranked visuals.

Step 508 updates the visualization based on visual activation progress. For instance, progress indicators for individual visuals can be periodically and/or incrementally updated to indicate activation progress for the visuals. As referenced above, a visual that is activated can be visually distinguished from other visuals that are not active.

According to various embodiments, a visual that is activated is selectable to cause various actions to occur, such as launching an application, retrieving content, accessing a resource, and so on.

In at least some embodiments, certain visuals may not be activated unless a user expressly requests activation. For instance, consider the following procedure.

Figure 6:
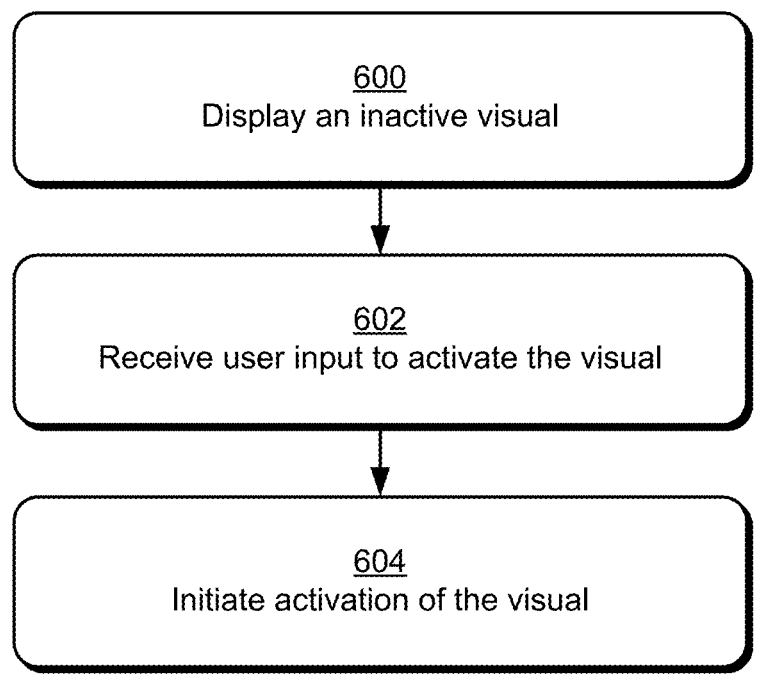
FIG. 6 is a flow diagram that describes steps in a method in accordance with one or more embodiments.

FIG. 6 is a flow diagram that describes steps in a method in accordance with one or more embodiments. Step 600 displays an inactive visual. The inactive visual, for example, can be displayed as a preview of functionality that is available to be activated but that is currently not active and/or in the process of being activated.

A visual may also represent collections of functionalities, such as entire modules of an operating system, collections of applications, collections of services, collections of content, and so on.

Step 602 receives user input to activate the visual. A user, for example, can select the visual via any suitable input method, examples of which are discussed below.

Step 604 initiates activation of the visual. For example, a download and/or installation of functionality represented by the visual can commence. Thus, in at least some embodiments, a visual may be displayed as a preview of available functionality until a user provides an express request for access to the functionality. Accordingly, some visuals may be automatically activated independent of user input, while others may not be activated unless a user expressly or implicitly requests activation of the visuals.

As referenced above, a visual can represent collections of functionalities, such as a portion of an operating system. Thus, in at least some embodiments, a visual that represents a particular portion of an operating system that is deemed to be non-essential to system performance can remain inactive unless a user requests activation of the visual.

In at least some embodiments, a visual activation sequence can be reordered based on various events. For instance, consider the following procedure.

Figure 7:
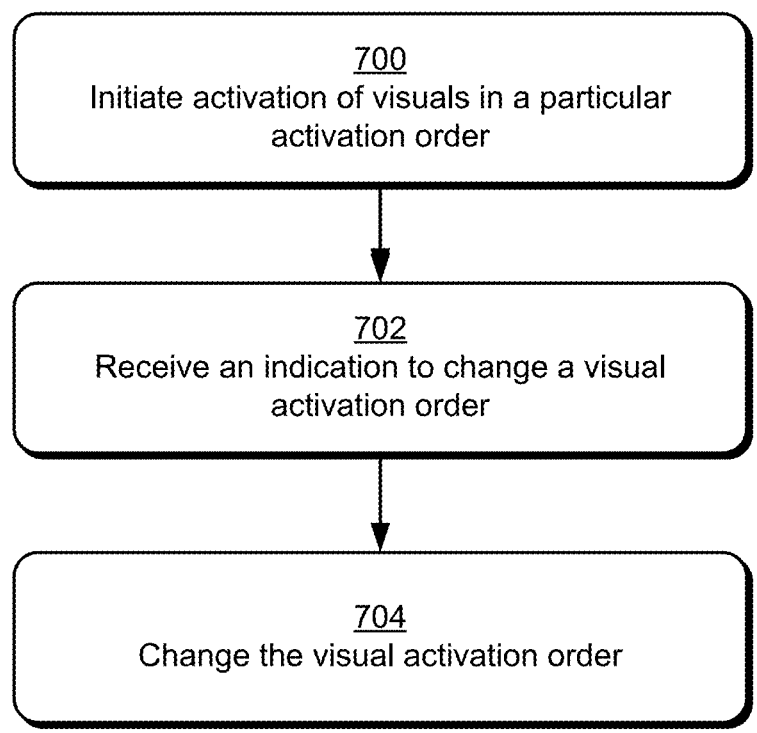
FIG. 7 is a flow diagram that describes steps in a method in accordance with one or more embodiments.

FIG. 7 is a flow diagram that describes steps in a method in accordance with one or more embodiments. Step 700 initiates activation of visuals in a particular activation order. As referenced above, visuals that are displayed as part of a visual configuration visualization can be activated in a particular order.

Step 702 receives an indication to change the visual activation order. Various events can occur that can cause the activation order to be altered.

In at least some embodiments, user selection of a visual can cause an activation order of the visual to be changed. For instance, consider a scenario where a particular visual has a lower activation order than other visuals. Based on the lower activation order, the particular visual is not scheduled to be activated until the other visuals reach a particular activation progress, such as partial and/or complete activation. Thus, activation of the particular visual may not be initiated until the other visuals reach a particular activation progress.

In response to a user selection of the particular visual, the particular visual can be promoted in an activation order. For example, activation of the particular visual can be prioritized above some or all other visuals in a visual configuration. Thus, an activation order can be reconfigured such that the particular visual is activated before other visuals that were originally scheduled to be activated first. In at least some embodiments, reconfiguring an activation order can cause activation of some visuals to be paused or slowed until a visual that is being promoted reaches a particular activation progress. This can allocate activation resources to a promoted visual, e.g., data bandwidth, processor bandwidth, memory resources, and so forth.

Visuals may also be demoted in an activation order. For example, a user can provide input indicating that activation of a particular visual can be de-prioritized. This can cause the particular visual to be moved below other visuals in an activation order, such as below other visuals that the particular visual was previously prioritized above. Demotion of a visual can cause activation of the visual can be suspended, such as temporarily and/or permanently. For example, activation of the visual can be suspended until other higher priority visuals reach a particular activation progress.

In at least some embodiments, activation order of a visual can be changed by manipulating the visual to various regions of a display. For instance, consider a scenario where activation order for a visual configuration is location-based such that visuals in a particular region are activated before visuals in other regions. A user can promote a visual in activation order by moving the visual from a lower priority region to a higher priority region. A user may also demote a visual by moving the visual from a higher priority region to a lower priority region.

Various other events may change a visual activation order. For example, if resources associated with a particular visual are slow and/or unavailable, the visual can be demoted in activation order to enable other visuals to be activated until resource availability improves. For instance, consider a scenario where activation of a visual involves downloading a file from a particular network resource. If a data connection to the particular network resource is slow or not available, activation of the visual can be demoted, e.g., until the data connection improves or is available.

As another example, a network resource can change an activation order remotely based on various considerations. The visual management resource 114, for example, can reconfigure an activation order for the computing device 102, such as via a notification to the visual manager module 112. A variety of other events not expressly mentioned herein may be implemented to alter visual activation order in accordance with the claimed embodiments.

Step 704 changes the visual activation order. The visual activation order may be changed in various ways and based on various considerations, examples of which are discussed above. In at least some embodiments, the visual activation order can be changed while visual activation is occurring, e.g., dynamically during activation of visuals. Thus, activation of visuals may proceed based on the changed visual activation order.

Having discussed some example procedures, consider now a discussion of an example system and device in accordance with one or more embodiments.

Example System and Device

Figure 8:
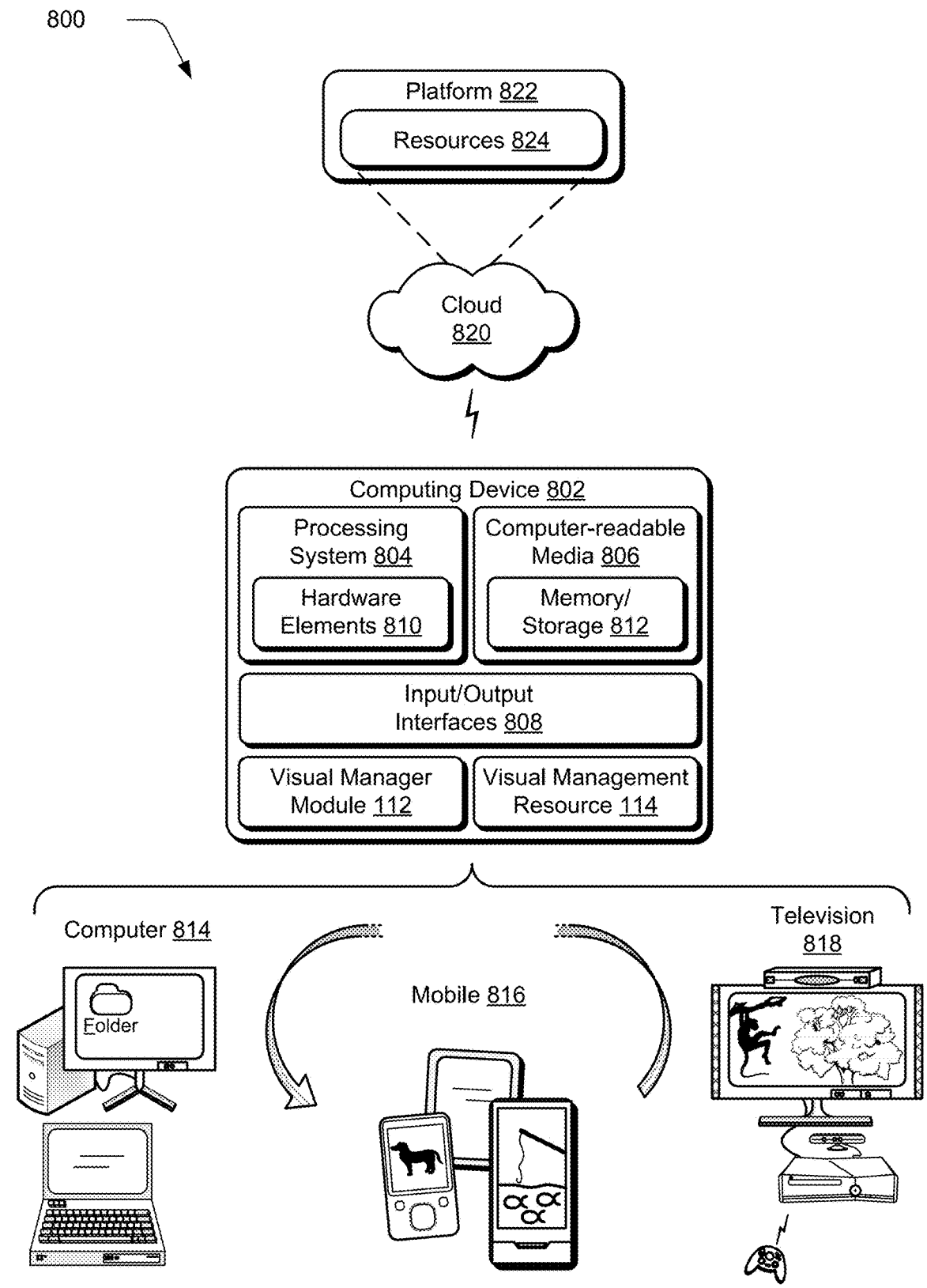
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement various techniques described herein. For example, the computing device 102 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 180 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the visual manager module 112 and/or the visual management resource 114 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for visual configuration and activation are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computing device comprising:
at least one processor; and
one or more computer-readable storage media including instructions stored thereon that, responsive to execution by the at least one processor, cause the computing device to perform operations including:
receiving, at the computing device from a visual management resource that stores a plurality of visual profiles in association with a plurality of user accounts, visualization data associated with a specific visual profile that corresponds to a specific user account, wherein the visualization data defines a positional-arrangement in which a plurality of visuals are to be displayed in association with the specific user account, and wherein different visuals of the plurality of visuals represent applications with different functionalities;
displaying, at the computing device, a visualization of the plurality of visuals in accordance with the positional-arrangement, wherein at least some visuals of the plurality of visuals represent corresponding applications that are currently inactive at the computing device;
determining an activation order for the at least some visuals of the plurality of visuals based on user interaction information that uniquely corresponds to the specific user account, the user interaction information indicating a frequency of user interaction with the at least some visuals of the plurality of visuals at the computing device or a different computing device;
concurrently with the displaying the visualization of the plurality of visuals in accordance with the positional-arrangement, automatically activating the at least some visuals of the plurality of visuals based on the activation order such that a first visual of the at least some visuals having a higher frequency of user interaction than a second visual of the at least some visuals is activated before the second visual; and
while continuing the activating of the at least some visuals:
dynamically updating the visualization to visually distinguish the first visual from the second visual when the first visual becomes activated prior to the second visual becoming activated, and
enabling selection of the first visual to access a represented application in response to activating the first visual.

2. The computing device as recited in claim 1, wherein displaying the visualization of the plurality of visuals in accordance with the positional-arrangement is performed in response to an initial user authentication with the computing device.

3. The computing device as recited in claim 1, wherein displaying is performed in response to at least one of a recovery process or a reconfiguration of the computing device.

4. The computing device as recited in claim 1, wherein the positional-arrangement in which the plurality of visuals is to be displayed in association with the specific user account represents a custom visual configuration that is generated in association with the specific user account.

5. The computing device as recited in claim 1, wherein the activation order is based on a visual order of the plurality of visuals in the positional-arrangement of the plurality of visuals.

6. The computing device as recited in claim 1, wherein the dynamically updating the visualization comprises displaying a progress indicator that indicates an activation progress for a specific visual within the positional-arrangement of the plurality of visuals.

7. The computing device as recited in claim 1, the operations further comprising changing the activation order in response to receiving an indication to change the activation order.

8. The computing device as recited in claim 7, wherein the indication to change the activation order comprises at least one of a user selection of a particular visual or a user manipulation of the particular visual such that the particular visual is promoted in the activation order.

9. The computing device as recited in claim 1, wherein a particular visual of the plurality of visuals represents a portion of an operating system, and activating the at least some of the visuals is performed without updating the particular visual representing the portion of the operating system.

10. One or more computer-readable storage media comprising instructions stored thereon that, responsive to execution by a computing system, cause the computing system to perform operations comprising:
    transmitting, to a visual management resource that stores a plurality of visual profiles in association with a plurality of user accounts, a request for visualization data associated with a specific visual profile that corresponds to a specific user account, the request transmitted in response to authenticating the specific user account at a device, the visualization data defining a positional-arrangement in which a plurality of visuals are to be displayed in association with the specific user account, wherein different visuals of the plurality of visuals represent applications with different functionalities;
    generating, at the device and based on the visualization data, a visualization of the plurality of visuals, the visualization including at least some visuals that represent a corresponding application that is currently inactive at the device;
    determining an activation order for activating the at least some visuals, the activation order being determined based on user interaction information describing a frequency of user interaction with the at least some visuals at the device or at a different device, the activation order being independent of the positional-arrangement in which the plurality of visuals is to be displayed in association with the specific user account;
    causing the device to display a rendering of the plurality of visuals in accordance with the positional-arrangement with at least one indication that the corresponding application of the at least some visuals is currently inactive at the device;
    causing the device to automatically activate the at least some visuals, concurrently while displaying the plurality of visuals in accordance with the positional-arrangement, based on the activation order by first activating a first visual of the at least some visuals that has a higher frequency of user interaction than a second visual of the at least some visuals; and
    while continuing to activate the at least some of the visuals, updating the rendering of the plurality of visuals to visually distinguish the first visual from the second visual when the first visual becomes activated prior to the second visual becoming activated.

11. One or more computer-readable storage media as recited in claim 10, wherein authenticating the specific user account is performed in response to one or more of a recovery process or a reconfiguration of the device.

12. One or more computer-readable storage media as recited in claim 10, wherein the positional-arrangement is customized in association with the specific user account.

13. A computer-implemented method, comprising:
    receiving, at a computing device from a visual management resource that stores a plurality of visual profiles in association with a plurality of user accounts, visualization data associated with a specific visual profile that corresponds to a specific user account, wherein the visualization data defines a positional-arrangement in which a plurality of visuals is to be displayed in association with the specific user account, wherein different visuals of the plurality of visuals represent applications with different functionalities;
    causing the computing device to render a visualization of the plurality of visuals in accordance with the positional-arrangement, wherein at least two of the visuals represent corresponding applications that are currently inactive at the computing device;
    initiating activation of the at least two visuals of the visualization in an activation order by downloading, installing, or registering one or more applications for each of the at least two visuals, wherein the activation order is determined based on user interaction information that corresponds to the specific user account, and wherein the user interaction information is independent of the positional-arrangement in which the plurality of visuals is to be displayed in association with the specific user account;
    receiving, after initiating the activation and prior to completing the activation, an indication to change the activation order;
    changing the activation order in response to receiving the indication by promoting a first visual of the at least two visuals in the activation order and demoting a second visual of the at least two visuals in the activation order; and
    enabling selection of the first visual to access an application that is represented by the first visual in response to activating the first visual, prior to completing activation of the second visual.

14. The computer-implemented method of claim 13, wherein the at least two visuals of the visualization represent, prior to activation, at least two applications that are not currently installed on the device.

15. The computer-implemented method of claim 13, wherein the activation order is based on at least one of a visual order of the visuals in the visualization or a visual priority indicated by a user.

16. The computer-implemented method of claim 13, wherein receiving the indication to change the activation order comprises receiving a user selection of the first visual.

17. The computer-implemented method of claim 13, wherein receiving the indication to change the activation order comprises receiving a user selection of the second visual.

18. The computer-implemented method of claim 13, further comprising activating the first visual and enabling selection of the first visual to access functionality represented by the first visual, prior to completion of activating the second visual.

19. A computing device as recited in claim 1, wherein enabling selection of the first visual is performed prior to completion of activating the second visual.

20. The computing device as recited in claim 1, wherein the activation order is determined based at least in part on one or more frequencies of use with which the specific user has used individual functionalities corresponding to individual visuals, and wherein the activation order is determined independently of the positional-arrangement.

* * * * *